US009309373B2

(12) United States Patent
Ito et al.

(10) Patent No.: US 9,309,373 B2
(45) Date of Patent: Apr. 12, 2016

(54) ADHESIVE COMPOSITION AND THERMALLY ADHESIVE MEMBER USING SAME

(75) Inventors: Takahiro Ito, Toyama (JP); Makoto Imahori, Toyama (JP); Tatsuo Nishio, Tokyo (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 13/996,858

(22) PCT Filed: Dec. 2, 2011

(86) PCT No.: PCT/JP2011/077929
§ 371 (c)(1),
(2), (4) Date: Sep. 6, 2013

(87) PCT Pub. No.: WO2012/090646
PCT Pub. Date: Jul. 5, 2012

(65) Prior Publication Data
US 2013/0338284 A1    Dec. 19, 2013

(30) Foreign Application Priority Data
Dec. 28, 2010    (JP) ................................ 2010-291817

(51) Int. Cl.
| C08K 5/07 | (2006.01) |
| C08K 5/01 | (2006.01) |
| C09J 151/06 | (2006.01) |
| B32B 7/12 | (2006.01) |
| C08G 18/62 | (2006.01) |
| C08G 18/79 | (2006.01) |
| C09J 175/04 | (2006.01) |
| C09J 123/16 | (2006.01) |
| B32B 15/08 | (2006.01) |
| C08F 255/02 | (2006.01) |
| C08F 255/04 | (2006.01) |
| C08L 51/06 | (2006.01) |
| C09J 123/28 | (2006.01) |

(52) U.S. Cl.
CPC ... C08K 5/01 (2013.01); B32B 7/12 (2013.01); B32B 15/08 (2013.01); C08F 255/02 (2013.01); C08F 255/04 (2013.01); C08G 18/6204 (2013.01); C08G 18/791 (2013.01); C08K 5/07 (2013.01); C08L 51/06 (2013.01); C09J 123/16 (2013.01); C09J 151/06 (2013.01); C09J 175/04 (2013.01); C08L 2205/025 (2013.01); C09J 123/286 (2013.01)

(58) Field of Classification Search
CPC .......... C08K 5/01; C08K 5/07; C09J 123/16; C09J 151/06; C09J 123/00; C09J 175/04; C09J 123/286; B32B 7/12; B32B 15/08; C08G 18/6204; C08G 18/791; C08F 255/02; C08F 255/04; C08F 222/06; C08F 220/18; C08F 2220/1883; C08L 2205/025; C08L 51/06
USPC .................................................. 524/196, 364
See application file for complete search history.

(56) References Cited

FOREIGN PATENT DOCUMENTS

| CN | 1547595 A | 11/2004 |
| CN | 1735672 A | 2/2006 |
| JP | 4 18480 | 1/1992 |
| JP | 10 273637 | 10/1998 |
| JP | 2839907 B2 * | 12/1998 |
| JP | 2000153577 A * | 6/2000 |
| JP | 2008-230198 | 10/2008 |
| JP | 2008230198 A * | 10/2008 |
| JP | 2010-92703 A | 4/2010 |
| WO | WO 03/020777 A1 | 3/2003 |
| WO | WO 2009/087776 A1 | 7/2009 |

OTHER PUBLICATIONS

JP 2839907 B2 (1998), machine translation, JPO Advanced Industrial Property Network (AIPN).*
JP 2000-153577 A (2000), machine translation, JPO Advanced Industrial Property Network (AIPN).*
JP 2008-230198 A (2008), machine translation, JPO Advanced Industrial Property Network (AIPN).*
WO 2009-087776 A1 (2009), machine translation, Google Patents.*
Extended European Search Report issued on Jan. 30, 2014 in the counterpart European Application No. 11853386.8.
International Search Report Issued Feb. 21, 2012 in PCT/JP11/77929 Filed Dec. 2, 2011.
Office Action in corresponding Taiwanese Application No. 100143723, dated Apr. 22, 2015. (w/English Translation).

* cited by examiner

*Primary Examiner* — Susannah Chung
*Assistant Examiner* — Josephine Chang
(74) *Attorney, Agent, or Firm* — Oblon, McClelland, Maier & Neustadt, L.L.P.

(57) ABSTRACT

Provided is an adhesive composition leading to sufficient adhesive strength when used for bonding to a polyolefin resin molded article that bonds poorly with other members. Also provided is an adhesive composition having excellent heat resistance (heat resistant adhesion) in the bonded part of a composite body obtained by joining a polyolefin resin-formed body and other member. This adhesive composition contains an organic solvent, a carboxyl group-containing polyolefin resin which is dissolved in this organic solvent and which has a melt flow rate of 5 to 40 g/10 min when measured at 130° C., and a polyfunctional isocyanate compound. This adhesive composition may further contain a carboxyl group-containing polyolefin resin having a melting point of 120° C. to 170° C.

11 Claims, 1 Drawing Sheet

13 12 11
1

14 13 12 11
1

ADHESIVE COMPOSITION AND THERMALLY ADHESIVE MEMBER USING SAME

FIELD OF THE INVENTION

The present invention relates to an adhesive composition, and a thermally adhesive member utilizing the adhesive composition. More specifically, the present invention relates to an adhesive composition that exhibits excellent adhesion, excellent heat resistance at the joint, and the like, and is useful for bonding a polyolefin resin-formed body (e.g., polyolefin resin film) with other member, and to a thermally adhesive member in which a metal foil (e.g., aluminum foil) and a thermally adhesive resin film are bonded using the adhesive composition.

BACKGROUND ART

Various adhesive compositions have been proposed to bond a polyolefin resin-formed body with poor adhesion to other member. For example, Patent Literature 1 discloses an adhesive composition for a polyolefin-based sheet containing an acid-modified chlorinated polyolefin resin having a softening point of 70° C. to 100° C., a specific amount of a blocked isocyanate, and an organic solvent. Patent Literature 2 discloses an adhesive composition in which components consisting of a carboxylic acid-containing polyolefin resin, a carboxylic acid-containing epoxy resin, a polyisocyanate compound, and an optional epoxy resin are dissolved or dispersed in an organic solvent.

An adhesive composition is used to bond a plurality of members to obtain a composite. The resulting composite is used for a hermetic container (e.g., food or chemical container), household goods, and the like. Such a composite can maintain shape stability when used in a normal living environment, but does not necessarily maintain shape stability when subjected to a high temperature of about 80° C. (e.g., when allowed to stand in a car in hot season).

PRIOR ART LITERATURE

Patent Literature

Patent Literature 1: JP A H10-273637
Patent Literature 2: JP A H4-18480

DISCLOSURE OF THE INVENTION

Problem that the Invention is to Solve

The adhesive compositions disclosed in Patent Literatures 1 and 2 exhibit good adhesion at room temperature, but exhibit insufficient heat resistance, particularly insufficient high-temperature bond strength (heat resistant adhesion) at the joint when the product obtained by bonding two members is subjected to a high temperature of about 80° C.

An object of the present invention is to provide an adhesive composition that exhibits sufficient bond strength when used to bond a polyolefin resin-formed body with poor adhesion to other member. Another object of the present invention is to provide an adhesive composition that exhibits excellent heat resistance (heat resistant adhesion) at the joint when used to bond a polyolefin resin-formed body and other member. A further object of the present invention is to provide a thermally adhesive member in which a metal foil (e.g., aluminum foil) and a thermally adhesive resin film (e.g., polyolefin resin film) are bonded using the adhesive composition.

Means for Solving the Problem

The present inventors conducted extensive studies in order to achieve the above objects. As a result, the inventors found that a composition containing a polyolefin resin having a carboxyl group and having specific properties, and a polyfunctional isocyanate compound, exhibits excellent adhesion, and leads to excellent adhesion and excellent heat resistance (heat resistant adhesion) at the joint when using different two types of polyolefin resins having a carboxyl group together with a polyfunctional isocyanate compound.

The present invention is as follows.

1. An adhesive composition comprising an organic solvent, a polyolefin resin (A) that is dissolved in the organic solvent, and a polyfunctional isocyanate compound, the polyolefin resin (A) having a melt flow rate measured at 130° C. of 5 to 40 g/10 min, and including a carboxyl group.
2. The adhesive composition according to 1 above, wherein a content of the carboxyl group in the polyolefin resin (A) is in a range from 0.01 to 2.0 mmol based on 1 g of the polyolefin resin (A).
3. The adhesive composition according to 1 or 2 above, further comprising a polyolefin resin (B) that has a melting point of 120° C. to 170° C., and includes a carboxyl group.
4. The adhesive composition according to 3 above, wherein a content of the carboxyl group in the polyolefin resin (B) is in a range from 0.01 to 2.0 mmol based on 1 g of the polyolefin resin (B).
5. The adhesive composition according to 3 or 4 above, wherein an average particle size of the polyolefin resin (B) is in a range from 1 to 50 μm.
6. The adhesive composition according to any one of 3 to 5 above, wherein a content of the polyolefin resin (A) and a content of the polyolefin resin (B) are respectively 1% to 70% by mass and 30% to 99% by mass based on 100% by mass of a total amount of the polyolefin resin (A) and the polyolefin resin (B).
7. A thermally adhesive member comprising an adhesive layer that is obtained by curing the adhesive composition according to any one of 1 to 6 above, a metal layer that is bonded to one side of the adhesive layer, and a thermally adhesive resin layer that is bonded to the other side of the adhesive layer.

Effect of the Invention

The adhesive composition of the present invention is suitably used to bond a polyolefin resin-formed body and other member such as a metal member and resin member, and can be used to bond polyolefin resin-formed bodies such as polyolefin resin films, or bond a polyolefin resin film and a metal foil such as an aluminum foil, or bond a polyolefin resin film and a metal layer of a composite film having a resin layer and a metal layer. The adhesive layer exhibits high bond strength at room temperature (25° C.). In the case where the adhesive layer includes the polyolefin resin (A) and the polyolefin resin (B), excellent heat resistance (heat resistant adhesion) and the like at the joint can be obtained at a temperature ranging from about 60° C. to 80° C. The thermally adhesive member obtained using the adhesive composition of the present invention is suitably used to form a thermally bonded composite product excellent in heat resistance (heat resistant adhesion). Therefore, when the thermally bonded composite product is used as a hermetic container including food container and chemical container, deterioration in contents can be prevented while maintaining the structure of the container.

EMBODIMENT FOR CARRYING OUT THE INVENTION

Figure 1:
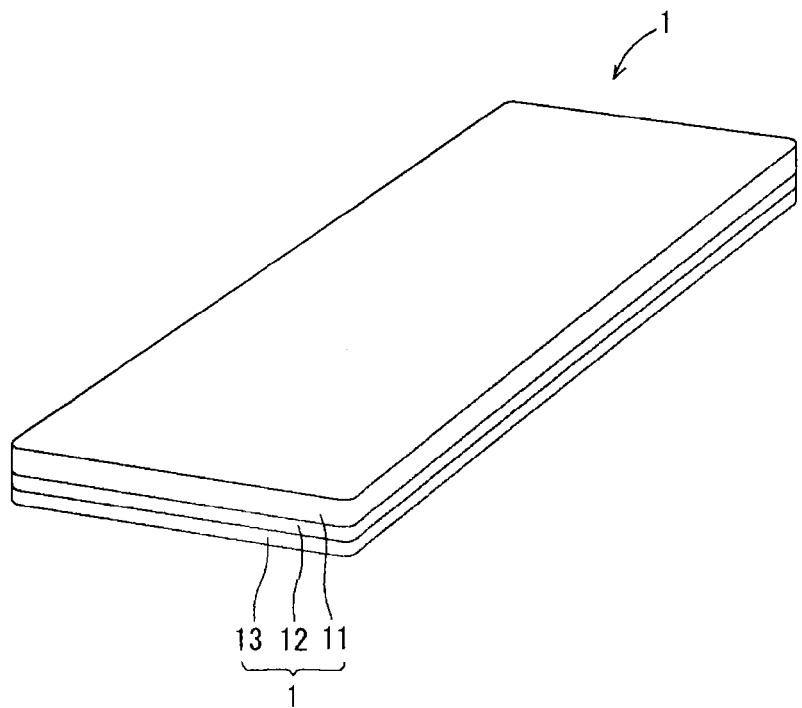
FIG. 1 is a schematic perspective view illustrating an example of a thermally adhesive member.

Hereinafter, the present invention will be described in detail.

1. Adhesive Composition

The adhesive composition of the present invention includes an organic solvent, a polyolefin resin (A) that is dissolved in the organic solvent, and a polyfunctional isocyanate compound, the polyolefin resin (A) having a melt flow rate (hereinafter referred to as "MFR") measured at a temperature of 130° C. between 5 and 40 g/10 min, and including a carboxyl group. The adhesive composition of the present invention may further include a polyolefin resin (B) that is dispersed in the organic solvent, the polyolefin resin (B) having a melting point between 120° C. and 170° C., and including a carboxyl group.

The content of carboxyl group in the polyolefin resin is determined as a value per 1 gram of the polyolefin resin by dividing the acid content in the polyolefin resin that is calculated from a calibration curve drawn using an infrared spectrum by the formula weight (45) of a carboxyl group.

The melting point of the polyolefin resin is measured in accordance with "Testing methods for transition temperatures of plastics" in JIS K 7121-1987.

In the description, the adhesive composition containing the polyolefin resin (A), and not containing the polyolefin resin (B) is hereinafter referred to as "first adhesive composition", and the adhesive composition containing both the polyolefin resin (A) and the polyolefin resin (B) is hereinafter referred to as "second adhesive composition".

The first adhesive composition is a composition in which the polyolefin resin (A) is dissolved in the organic solvent.

The second adhesive composition is a composition in which at least the polyolefin resin (A) is dissolved in the organic solvent, and the polyolefin resin (B) may or may not be dissolved in the organic solvent.

The polyolefin resin (A) is not particularly limited so long as it is a carboxyl group-containing polyolefin resin having a melt flow rate (MFR) measured at 130° C. of 5 to 40 g/10 min. Examples of the polyolefin resin (A) include a modified polyolefin resin (A1) obtained by subjecting an unmodified polyolefin resin and an ethylenically unsaturated carboxylic acid or an anhydride thereof to graft polymerization, and a copolymer resin (A2) obtained by polymerizing an olefin monomer and an ethylenically unsaturated carboxylic acid. These polyolefin resins may be used singly or in combination. The polyolefin resin (A) can be produced by publicly known methods. For example, the polyolefin resin (A) can be produced by the method disclosed in WO2005/82963 or WO2008/13085.

Examples of the unmodified polyolefin resin for the formation of the modified polyolefin resin (A1) include homopolymers and copolymers of an olefin monomer such as ethylene, propylene, and 1-butene, copolymers of the olefin monomer and dicyclopentadiene, 4-methylpentene-1, or vinyl acetate, and the like. A propylene homopolymer, a copolymer of propylene and ethylene, and a copolymer of propylene and 1-butene are preferable as the unmodified polyolefin resin. When the unmodified polyolefin resin is a copolymer, the content of propylene monomer unit is preferably in the range from 50% to 90% by mass based on 100% by mass of the total amount of monomer units constituting the copolymer.

Examples of the ethylenically unsaturated carboxylic acid for the formation of the modified polyolefin resin (A1) or the copolymer resin (A2) include acrylic acid, methacrylic acid, maleic acid, fumaric acid, crotonic acid, itaconic acid, citraconic acid, 5-norbornene-2,3-dicarboxylic acid, and the like. These ethylenically unsaturated carboxylic acids may be used singly or in combination of two or more types thereof.

The polyolefin resin (A) is preferably the modified polyolefin resin (A1), more preferably a resin obtained by modifying a propylene homopolymer or a copolymer of propylene and ethylene, and particularly a resin obtained by modifying a propylene homopolymer.

MFR of the polyolefin resin (A) is in the range from 5 to 40 g/10 min. and preferably from 5 to 30 g/10 min. from the viewpoint of adhesion. If the MFR of the polyolefin resin (A) is lower than 5 g/10 min, the stability of the adhesive composition may significantly be deteriorated, or the adhesion may be deteriorated. If the MFR of the polyolefin resin (A) exceeds 40 g/10 min, the adhesion at a temperature ranging about 60° C. to 80° C. may be deteriorated.

The MFR of the polyolefin resin (A) can be adjusted by utilizing a propylene copolymer resin material obtained by copolymerizing propylene with ethylene, 1-butene, or the like in an appropriate ratio and adjusting MFR as a raw material that is to be modified with an acid.

The content of the carboxyl group in the polyolefin resin (A) is preferably in the range from 0.10 to 2.0 mmol, and more preferably from 0.15 to 1.0 mmol based on 1 g of the polyolefin resin (A) from the viewpoint of adhesion. If the content of the carboxyl group is less than 0.10 mmol, the adhesive composition may lead to poor adhesion to an adherend having a surface that includes a high-polarity substance such as aluminum. If the content of the carboxyl group exceeds 2.0 mmol, the adhesive composition may lead to poor adhesion to an adherend having a surface that includes a low-polarity substance such as a polyolefin. Moreover, the adhesive composition may lead to corrosion of an adherend when the adherend includes aluminum or the like.

The melting point of the polyolefin resin (A) is preferably in the range from 50° C. to 90° C., and more preferably from 60° C. to 85° C. If the melting point of the polyolefin resin (A) is lower than 50° C., bond strength in a joint may be deteriorated at a temperature equal to or higher than 80° C. If the melting point of the polyolefin resin (A) exceeds 90° C., the viscosity of the adhesive composition may be increased, and the storage stability of the adhesive composition may be deteriorated.

The polyolefin resin (A) having a melting point within the preferable range can be obtained by adjusting the production conditions for the unmodified polyolefin resin that is used to produce the modified polyolefin resin (A1), or the production conditions for the copolymer resin (A2), for example.

In the adhesive composition of the present invention, the polyolefin resin (A) is dissolved in an organic solvent. Specifically, the organic solvent is a substance that dissolves the polyolefin resin (A).

It is preferable that the organic solvent in which the polyolefin resin (A) is dissolved be an organic solvent that can be easily volatilized and removed by heating the adhesive composition. Examples of such an organic solvent include an aromatic organic solvent such as toluene and xylene, an aliphatic organic solvent such as n-hexane, an alicyclic organic solvent such as cyclohexane and methylcyclohexane, a ketone-based organic solvent such as methyl ethyl ketone, and the like. These organic solvents may be used singly or in combination of two or more types thereof.

The mass ratio between the organic solvent and the polyolefin resin (A) in the first adhesive composition is not particularly limited. The mass ratio between the organic solvent and the polyolefin resin (A) may be determined depending on the type of the organic solvent, the type of the polyolefin resin, and the like. The content of the polyolefin resin (A) is preferably 5% to 25% by mass, and particularly from 10% to 20% by mass based on 100% by mass of the total amount of the organic solvent and the polyolefin resin (A). If the content of the polyolefin resin (A) is within the above range, the adhesive composition can be easily applied to an adherend, and excellent workability is achieved.

Whether or not the polyolefin resin (A) is dissolved can be determined by applying a solution (organic solvent: toluene/methyl ethyl ketone=8/2) of the polyolefin resin (A) at a concentration of 20% to a polyethylene terephthalate film or the like using a bar coater to form a coating having a thickness of 150 to 200 µm, drying the coating, and determining whether or not the resulting film (thickness: 30 to 40 µm) has a surface roughness of 50 µm or less. The surface roughness of the film can be measured using a stylus-type surface roughness tester specified in JIS B 0651.

The polyfunctional isocyanate compound is one which reacts with a carboxyl group included in the polyolefin resin, and cures to form an adhesive. The polyfunctional isocyanate compound is not particularly limited so long as it has two or more isocyanate groups in the molecule. An aromatic isocyanate compound, an aliphatic isocyanate compound, an alicyclic isocyanate compound, or a modified product thereof may be used as the polyfunctional isocyanate compound. Specific example thereof includes a diisocyanate compound such as toluene diisocyanate, diphenylmethane diisocyanate, hexamethylene diisocyanate, and isophorone diisocyanate, isocyanurate-modified products, biuret-modified products, and polyhydric alcohol (e.g., trimethylolpropane) addition-modified products of these diisocyanate compounds, blocked isocyanates that are stabilized by masking an isocyanate using a blocking agent, and the like. These polyfunctional isocyanate compounds may be used singly or in combination of two or more types thereof. It is preferable to use a compound having three or more isocyanate groups in the molecule as the polyfunctional isocyanate compound. The polyfunctional isocyanate compound included in the adhesive composition of the present invention is normally dissolved in the organic solvent.

In the first adhesive composition, the mass ratio of the polyolefin resin (A) to the polyfunctional isocyanate compound is not particularly limited. The polyolefin resin (A) and the polyfunctional isocyanate compound are used so that the equivalent ratio (NCO/OH) of an isocyanate group (NCO) included in the polyfunctional isocyanate compound to a hydroxyl group (OH) in the carboxyl group included in the polyolefin resin (A) is preferably in the range from 0.01 to 12.0, more preferably from 0.04 to 12.0, further preferably from 0.1 to 12.0, and particularly from 0.1 to 9.0. When the equivalent ratio is in the range from 0.01 to 12.0, it is possible to obtain an adhesive composition that leads to excellent initial adhesion, and to form a cured product (adhesive) having sufficient crosslink density and being excellent in flexibility and the like.

The adhesive composition of the present invention may further include a carboxyl group-containing polyolefin resin (B) having a melting point between 120° C. and 170° C. (second adhesive composition). Resins exemplified in the explanation for the polyolefin resin (A) can be used as the polyolefin resin (B). Example thereof include a modified polyolefin resin obtained by subjecting an unmodified polyolefin resin and an ethylenically unsaturated carboxylic acid or an anhydride thereof to graft polymerization, and a copolymer resin obtained by polymerizing an olefin monomer and an ethylenically unsaturated carboxylic acid. These resins may be used singly or in combination of two or more types thereof. Examples of the unmodified polyolefin resin and the ethylenically unsaturated carboxylic acid used for the production of the polyolefin resin (B) include those mentioned above in connection with the polyolefin resin (A). Preferable unmodified polyolefin resins are a propylene homopolymer, a copolymer of propylene and ethylene, and a copolymer of propylene and 1-butene. When the unmodified polyolefin resin is a copolymer, the content of propylene monomer unit is preferably in the range from 50% to 90% by mass based on 100% by mass of the total amount of monomer units constituting the copolymer.

The polyolefin resin (B) is preferably a resin obtained by modifying a propylene homopolymer, a copolymer of propylene and ethylene, or a copolymer of propylene and 1-butene since the joint between two members exhibits high adhesion at a high temperature of up to about 80° C., and adhesion to a low-polarity adherend can be improved.

The melting point of the polyolefin resin (B) is preferably in the range from 120° C. to 170° C., and more preferably from 130° C. to 160° C. When the polyolefin resin (B) having a melting point between 120° C. and 170° C. is contained, the joint between two members exhibits improved bond strength at a high temperature of up to about 80° C. If the melting point of the polyolefin resin (B) exceeds 170° C., two members may not be sufficiently bonded. Moreover, workability may be deteriorated since it may be necessary to increase the bonding temperature.

The polyolefin resin (B) having a melting point within the preferable range can be obtained by adjusting the production conditions for the unmodified polyolefin resin that is used to produce the modified polyolefin resin, or the production conditions for the copolymer resin, for example.

The content of the carboxyl group in the polyolefin resin (B) is preferably in the range from 0.01 to 2.0 mmol, and particularly from 0.1 to 1.0 mmol based on 1 g of the polyolefin resin (B) from the viewpoint of heat resistant adhesion. If the content of the carboxyl group is less than 0.01 mmol, the adhesive composition may lead to poor adhesion to an adherend having a surface that includes a high-polarity substance such as aluminum. If the content of the carboxyl group exceeds 2.0 mmol, the adhesive composition may lead to poor adhesion to an adherend having a surface that includes a low-polarity substance such as a polyolefin. Moreover, the adhesive composition may lead to corrosion of an adherend when the adherend includes aluminum or the like.

The polyolefin resin (B) according to the second adhesive composition may be dissolved in the organic solvent similarly to the polyolefin resin (A), or may be insoluble in the organic solvent. The polyolefin resin (B) may or may not be dissolved in the organic solvent depending on the temperature of the organic solvent or the production method of the polyolefin resin (B).

It is preferable that the polyolefin resin (B) be dispersed in the organic solvent without being dissolved in the organic solvent. In this case, the polyolefin resin (B) may have an arbitrary shape such as a spherical shape, a spindle-like shape, a dish-like shape, a linear shape, a cluster-like shape, and an irregular shape. The average particle size (D50) of the polyolefin resin (B) is preferably in the range from 1 to 50 μm, and more preferably from 5 to 20 μm from the viewpoint of heat resistant adhesion. If the average particle size (D50) is too large, elevations and depressions may significantly occur due to large resin particles, and the appearance of a thermally bonded composite product or the like produced using a thermally adhesive member (described later) may be deteriorated. Moreover, adhesion failure may occur around the resin particles.

The average particle size (D50) is a volume average particle size, and refers to the particle size at 50% in the cumulative particle size distribution obtained using an analyzer "Coulter Counter" manufactured by Beckman Coulter, Inc., or the like.

In the second adhesive composition, the content of the polyolefin resin (A) and the content of the polyolefin resin (B) are preferably 1% to 70% by mass and 30% to 99% by mass, more preferably 3% to 50% by mass and 50% to 97% by mass, and particularly 5% to 40% by mass and 60% to 95% by mass, respectively, based on 100% by mass of the total amount of the polyolefin resin (A) and the polyolefin resin (B). If the content of the polyolefin resin (A) is less than 1% by mass, bond strength at room temperature (25° C.) may be insufficient. On the other hand, if the content of the polyolefin resin (A) exceeds 70% by mass, high-temperature bond strength may be deteriorated and heat resistant adhesion may be deteriorated.

In the second adhesive composition, the mass ratio of the total amount of the polyolefin resin (A) and the polyolefin resin (B) to the polyfunctional isocyanate compound is not particularly limited. The polyolefin resin (A), the polyolefin resin (B) and the polyfunctional isocyanate compound are used so that the equivalent ratio (NCO/OH) of an isocyanate group (NCO) included in the polyfunctional isocyanate compound to a hydroxyl group (OH) in the carboxyl group included in the polyolefin resin (A) and the polyolefin resin (B) is preferably in the range from 0.01 to 12.0, more preferably from 0.04 to 12.0, further preferably from 0.1 to 12.0, and particularly from 0.1 to 9.0. When the equivalent ratio is in the range from 0.01 to 12.0, it is possible to obtain an adhesive composition that leads to excellent initial adhesion, and to form a cured product (adhesive) having sufficient crosslink density and being excellent in flexibility and the like.

In the second adhesive composition, the mass ratio of the organic solvent to the total amount of the polyolefin resin (A) and the polyolefin resin (B) is not particularly limited. The mass ratio of the organic solvent to the total amount of the polyolefin resin (A) and the polyolefin resin (B) may be determined depending on the type of the organic solvent, the type of the polyolefin resin, and the like. The total content of the polyolefin resin (A) and the polyolefin resin (B) is preferably in the range from 5% to 25% by mass, and particularly from 10% to 20% by mass based on 100% by mass of the total amount of the organic solvent, the polyolefin resin (A), and the polyolefin resin (B). If the total content of the polyolefin resin (A) and the polyolefin resin (B) is within the above range, the adhesive composition can be easily applied to an adherend, and excellent workability is achieved.

Whether or not the polyolefin resin (B) is dissolved can be determined, in the same manner as described above, by applying a solution of the polyolefin resin (A) and the polyolefin resin (B), and determining whether or not the resulting film has a surface roughness of 50 μm or less.

The adhesive composition of the present invention may include a reaction accelerator, a tackifying resin, a thermoplastic elastomer that is not modified with an acid, a thermoplastic resin that is not modified with an acid, a plasticizer, and the like in addition to the polyolefin resin and the polyfunctional isocyanate compound.

The reaction accelerator is one having a function promoting the reaction between the polyolefin resin and the polyfunctional isocyanate compound. Examples of the reaction accelerator include an organotin compound and a tertiary amine.

Examples of the organotin compound include a dialkyltin fatty acid in which the number of carbon atoms of the alkyl group is 3 to 10, such as dibutyltin dilaurate, dibutyltin dimaleate, dioctyltin dilaurate, and dioctyltin dimaleate, and the like. These compounds may be used singly or in combination of two or more types thereof.

Examples of the tertiary amine include a tetraalkylethylenediamine such as tetramethylethylenediamine; a N,N'-dialkylbenzylamine such as dimethylbenzylamine; triethylenediamine, pentamethyldiethylenetriamine, N-ethylmorpholine, N-methylmorpholine, 1-methyl-4-dimethylamine ethylpiperazine, and the like. These compounds may be used singly or in combination of two or more types thereof.

An organotin compound and a tertiary amine may be used in combination as the reaction accelerator. The content of the reaction accelerator is preferably in the range from 0.01% to 1% by mass based on the total content of the resin component.

Examples of the tackifier include a polyterpene-based resin, a rosin-based resin, an aliphatic petroleum resin, an alicyclic petroleum resin, a copolymeric petroleum resin, a hydrogenated petroleum resin, and the like. These tackifiers may be used singly or in combination of two or more types thereof.

Examples of the polyterpene-based resin include an α-pinene polymer, β-pinene polymer, and a copolymer of at least one monomer among these with phenol, bisphenol A, or the like. Examples of the rosin-based resin include natural rosin, polymer rosin, ester derivatives thereof, and the like. The aliphatic petroleum resin ($C_5$-based resin) is normally synthesized from $C_5$ petroleum fractions. The alicyclic petroleum resin ($C_9$-based resin) is normally synthesized from $C_9$ petroleum fractions. The copolymeric petroleum resin may be referred to as $C_5/C_9$ copolymeric resin. The hydrogenated petroleum resin is normally produced by hydrogenating the above petroleum resins.

Preferable examples of the thermoplastic elastomer that is not modified with an acid include SEBS, SEPS, and the like. Preferable examples of the thermoplastic resin that is not modified with an acid include an ethylene-vinyl acetate copolymer resin, an ethylene-ethyl acrylate copolymer resin, wax, and the like. Preferable examples of the plasticizer include a liquid rubber such as polyisoprene and polybutene; a processing oil, and the like.

The content of the tackifier, the thermoplastic elastomer, or the like is preferably 70% or less by mass, more preferably in the range from 10% to 60% by mass, and more preferably from 20% to 50% by mass based on 100% by mass of the total amount of the adhesive composition of the present invention. This makes it possible to obtain an adhesive composition that exhibits sufficient adhesion, heat resistant adhesion, and the like.

In the present invention, the preferable production method of the first adhesive composition is a method in which a solution prepared by dissolving the polyolefin resin (A) in an organic solvent and an additional component other than the polyfunctional isocyanate compound are mixed, and then the resulting mixture and a polyfunctional isocyanate compound are mixed. The mixing temperature is normally 40° C. or lower, and preferably in the range from 10° C. to 30° C.

A commercially available product may be used for the polyfunctional isocyanate compound. Examples of a commercially available isocyanurate-modified isocyanate compound include "Coronate HX" (manufactured by Nippon Polyurethane Industry Co., Ltd.), "Duranate TPA-100" (manufactured by Asahi Kasei Chemicals Corporation), "Takenate D-170N" (manufactured by Mitsui Takeda Chemicals Inc.), and the like. Examples of a commercially available biuret-modified isocyanate compound include "Takenate D-165NN" (manufactured by Mitsui Takeda Chemicals Inc.) and the like. Examples of a commercially available trimethylolpropane addition-modified isocyanate compound include "Coronate L" (manufactured by Nippon Polyurethane Industry Co., Ltd.), "Takenate D-102" (manufactured by Mitsui Takeda Chemicals Inc.), "Takenate D-140N" (manufactured by Mitsui Takeda Chemicals Inc.), and the like. Examples of a commercially available blocked isocyanate that is stabilized by masking an isocyanate using a blocking agent include "Coronate 2507" (manufactured by Nippon Polyurethane Industry Co., Ltd.), "Coronate 2513" (manufactured by Nippon Polyurethane Industry Co., Ltd.), and the like.

In the present invention, the preferable production method of the second adhesive composition is a method in which a solution prepared by dissolving the polyolefin resin (A) in an organic solvent (S-1), a solution or dispersion prepared by dissolving or dispersing the polyolefin resin (B) in an organic solvent (S-2), and an additional component other than the polyfunctional isocyanate compound are mixed, and then the resulting mixture and the polyfunctional isocyanate compound are mixed. The mixing temperature is normally 40° C. or lower, and preferably in the range from 10° C. to 30° C. The organic solvent (S-1) and the organic solvent (S-2) may be either identical or different.

Examples of preparation method of the dispersion containing the polyolefin resin (B) include a method in which a polyolefin resin (B) that is insoluble in the organic solvent (S-2) is physically pulverized, and then the resulting powder is subjected to dispersing in the organic solvent (S-2), a method in which a polyolefin resin (B) dissolvable in a high-temperature organic solvent (S-2) is heated and dissolved in the organic solvent (S-2), and then the resulting solution is cooled to precipitate and obtain a dispersion where the polyolefin resin (B) is dispersed in the organic solvent (S-2), a method in which a solution of the polyolefin resin (B) is prepared using a good solvent, and then a poor solvent is added to the solution to precipitate the polyolefin resin (B), and the like. When the second adhesive composition is prepared using the dispersion of the polyolefin resin (B), the polyolefin resin (B) is normally dispersed in the organic solvent (i.e., the mixture of organic solvents (S-1) and (S-2)) without being dissolved in the organic solvent.

According to the present invention, when a coating is formed using the adhesive composition and dried to volatilize the organic solvent, a dry film, i.e., cured product can be obtained. The dry film exhibits tackiness and adhesion at a temperature equal to or higher than 60° C. The drying temperature for the coating is not particularly limited, and it is preferably between 30° C. and 100° C. from the viewpoint of workability. The dry film contains a reaction product of the polyolefin resin (A) and the polyfunctional isocyanate compound, or a reaction product of the polyolefin resins (A) and (B) and the polyfunctional isocyanate compound (i.e., a compound obtained by the reaction between a carboxyl group included in the polyolefin resin and an isocyanate group included in the polyfunctional isocyanate compound), and the reaction product functions as an adhesive capable of bonding two members. When it is desired to firmly bond two members, the two members may be compression-bonded at a temperature equal to or higher than 80° C., for example.

The thermally adhesive member of the present invention has an adhesive layer that is obtained by curing the adhesive composition of the present invention, a metal layer that is bonded to one side of the adhesive layer, and a thermally adhesive resin layer that is bonded to the other side of the adhesive layer.

Figure 2:
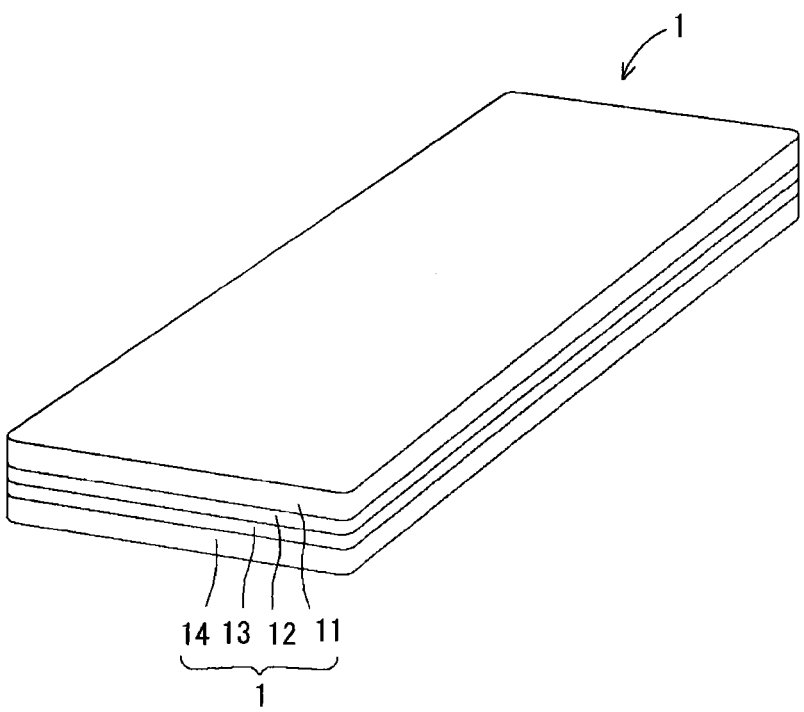
FIG. 2 is a schematic perspective view illustrating another example of a thermally adhesive member.

FIGS. 1 and 2 are schematic views illustrating the thermally adhesive member of the present invention. A thermally adhesive member 1 shown in FIG. 1 sequentially has a thermally adhesive resin layer 11, an adhesive layer 12, and a metal layer 13. A thermally adhesive member 1 shown in FIG. 2 sequentially has a thermally adhesive resin layer 11, an adhesive layer 12, a metal layer 13, and an additional layer 14.

The shape of the thermally adhesive member of the present invention is appropriately selected depending on the application and the like. The thermally adhesive member may have a sheet-like shape (see FIGS. 1 and 2), a linear shape, a point-like shape, a lattice-like shape, a checkered pattern shape, or the like.

The thermally adhesive resin layer is a layer containing a resin that melts due to heat, and bonds a material constituting a layer on one side of the thermally adhesive resin layer and a material constituting a layer on the other side of the thermally adhesive resin layer. The thermally adhesive resin layer is preferably a layer containing a resin that melts at a temperature between 50° C. and 200° C. Examples of such a resin include a polyolefin resin, a polyamide resin, a polyester resin, and the like. Among these, a polyolefin resin is preferable since it is possible to thermally bond the materials with sufficient strength. The polyolefin resin is preferably a polypropylene. Particularly preferred is an unstretched polypropylene since a dimensional change (shrinkage) occurs to only a small extent when bonding other member using the thermally adhesive member.

The thermally adhesive resin layer may be a layer optionally including additives such as a lubricant, a filler, a thermal stabilizer, an antioxidant, a UV absorber, an antistatic agent, a flame retardant, a coloring agent, a dispersant, and an adhesion promoter.

The thickness of the thermally adhesive resin layer is not particularly limited depending on types of the resin and the like, but is normally in the range from 10 to 200 μm. For example, when the thermally adhesive resin layer contains unstretched polypropylene, the thickness of the thermally adhesive resin layer is preferably in the range from 10 to 200 μm, more preferably from 20 to 100 μm, and further preferably from 60 to 100 μm. When the thickness of the thermally adhesive resin layer containing unstretched polypropylene is in the range from 10 to 200 μm, it is possible to obtain a thermally bonded composite product such as a hermetic container that does not easily break, and exhibits high durability.

The adhesive layer is a layer formed by curing of the above-mentioned adhesive composition. Specifically, the adhesive layer is a layer consisting of a cured product that includes a reaction product of the polyolefin resin (A) and the polyfunctional isocyanate compound; a mixture of a reaction product of the polyolefin resin (A) and the polyfunctional isocyanate compound and a reaction product of the polyolefin resin (B) and the polyfunctional isocyanate compound; or a reaction product of the polyolefin resins (A) and (B) with the polyfunctional isocyanate compound. The thickness of the adhesive layer is not particularly limited depending on types of the material, the application of the thermally adhesive member, and the like, but is preferably in the range from 1 to 20 μm, and more preferably from 2 to 10 μm. When the thickness of the adhesive layer is in the range from 1 to 20 μm, it is easy to bend or fold a sheet-like thermally adhesive member, for example.

The metal layer is a layer that includes a metal or an alloy. The metal or the alloy is not particularly limited, but aluminum is normally used due to excellent workability. The thickness of the metal layer is appropriately selected depending on the material, the application of the thermally adhesive member, and the like. For example, when the metal layer is formed of aluminum, the thickness of the metal layer is preferably in the range from 20 to 100 μm, more preferably from 20 to 80 μm, and further preferably from 30 to 60 μm.

When the thermally adhesive member of the present invention has the metal layer, the additional layer 14 may be provided on the surface of the metal layer 13 (see FIG. 2). It is preferable that a material for forming the additional layer contains a resin from the viewpoint of protecting the metal layer. Specifically, it is preferable that the additional layer be a resin layer. The resin is not particularly limited, and a polyamide resin, a polyester resin, or the like may be used. The resin layer may or may not be transparent. In the case where the resin layer is transparent or translucent, excellent appearance can be obtained when the thermally bonded composite product is a hermetic container or the like.

The thickness of the additional layer is not particularly limited, but is preferably 30 to 60 μm, and particularly from 30 to 50 μm.

The production method of the thermally adhesive member shown in FIG. 1 is as follows.

(1) A method in which the adhesive composition is applied to the surface of a metal foil, a metal film, or the like for forming the metal layer 13, the organic solvent is removed from the composition to form the adhesive layer 12, a resin film (thermally adhesive resin film) for forming the thermally adhesive resin layer 11 is brought into contact with the side on which the adhesive layer 12 is formed, and then compression-bonded while heating.

(2) A method in which the adhesive composition is applied to the surface of a resin film (thermally adhesive resin film) for forming the thermally adhesive resin layer 11, the organic solvent is removed from the composition to form the adhesive layer 12, a metal foil or the like for forming the metal layer 13 is brought into contact with the side on which the adhesive layer 12 is formed, and then compression-bonded while heating.

The production method of the thermally adhesive member shown in FIG. 2 is as follows.

(3) A method in which the adhesive composition is applied to the surface of the metal layer 13 of a composite film having a resin layer constituting the additional layer 14, and the metal layer 13 that is formed on one side of the resin layer by evaporation (deposition) or the like, the organic solvent is removed from the composition to form the adhesive layer 12, a resin film (thermally adhesive resin film) for forming the thermally adhesive resin layer 11 is brought into contact with the side on which the adhesive layer 12 is formed, and then compression-bonded while heating.

(4) A method in which the adhesive composition is applied to the surface of a resin film (thermally adhesive resin film) for forming the thermally adhesive resin layer 11, the organic solvent is removed from the composition to form the adhesive layer 12, the surface of the metal layer 13 of a composite film having a resin layer constituting the additional layer 14, and the metal layer 13 that is formed on one side of the resin layer by evaporation (deposition) or the like is brought into contact with the side on which the adhesive layer 12 is formed, and then compression-bonded while heating.

(5) A method in which a film for forming the additional layer 14 is formed, by extrusion molding, on the surface of the metal layer 13 in the laminate obtained by (1) or (2).

The adhesive composition is normally applied to a metal layer-forming material such as a metal foil, or the surface of a metal layer of a composite film having a metal layer and an additional layer (resin layer). The adhesive composition may be applied to an arbitrary material. In the case of a metal foil, it is preferable to use an aluminum foil having a thickness of 20 to 100 μm. This makes it possible to easily form a thermally adhesive member that does not easily break. In the case of a composite film, it is preferable that the metal layer includes aluminum, and the additional layer (resin layer) includes a polyamide resin, a polyester resin, or the like. When the thermally adhesive member shown in FIG. 2 is produced without using a composite film (i.e., when the method (5) is conducted), it is preferable to use a film containing a polyamide resin, a polyester resin, or the like as the film for forming the additional layer 14.

The thermally adhesive resin film may be a polyolefin resin film, a polyamide resin film, a polyester resin film, or the like. These resin films may be obtained by an extrusion method, a cast molding method, a T-die method, an inflation method, or the like. The thickness of the thermally adhesive resin film is normally in the range from 10 to 200 μm. In the present invention, a polyolefin resin film is preferably used and an unstretched polypropylene film is particularly used since it is possible to easily produce the thermally adhesive member and the thermally bonded composite product via thermal bonding. When the unstretched polypropylene film is used, the thickness thereof is preferably in the range from 10 to 200 μm, more preferably from 20 to 100 μm, and further preferably 60 to 100 μm.

The adhesive composition may be applied by a publicly known method. For example, the adhesive composition may be applied using a bar coater, a gravure coater, or the like. The thickness of the coating and the drying temperature are not particularly limited. The drying temperature of the coating is preferably in the range from 30° C. to 100° C. Since the dry film normally exhibits tackiness and adhesion as mentioned above, two members can be bonded without heating. When the thermally adhesive member of the present invention is produced, two members are subjected to compression-bonding or the like while heating the members at a temperature that is determined taking account of the melting point, the melt viscosity, and the like of the resin component including polyolefin resin (A) or polyolefin resins (A) and (B). The heating conditions and the compression-bonding conditions employed for finishing the thermally adhesive member are not particularly limited. It is preferable to set the heating conditions and the compression-bonding conditions taking account of the material of the metal foil, the material, the melting point, and the like of the thermally adhesive resin film, the composition of the adhesive layer, and the like.

When the thermally adhesive resin layer contains an unstretched polypropylene in the thermally adhesive member of the present invention, it is possible to obtain a thermally bonded composite product such as a hermetic container that does not easily break, and exhibits high durability.

EXAMPLES

The invention is further described below by ways of Examples and Comparative Examples. Note that the present invention is not limited to the following examples.

1. Evaluation Method

MFR, melting point, average particle size, viscosity, and peel strength were measured as described below.

1-1. MFR

MFR was measured in accordance with JIS K 7210. The measurement temperature was set to 130° C.

1-2. Melting Point

Melting point was measured using a differential scanning calorimeter (DSC) in accordance with JIS K 7121-1987. The temperature increase rate was set to 10° C./min.

1-3. Average Particle Size (D50)

The average particle size (D50) was measured using an analyzer "Coulter Counter" manufactured by Beckman Coulter, Inc.

1-4. Viscosity

The viscosity was measured at a temperature of 25° C.±0.5° C. using a Brookfield rotational viscometer manufactured by Tokyo Keiki Inc.

1-5. Peel Strength (1) Preparation of Specimen

The adhesive composition was applied using a bar coater to an aluminum foil (100×200 mm) having a thickness of 40 μm and subjected to a chemical surface treatment. The coating was dried at a temperature of 80° C. for 60 seconds, and then dried at 180° C. for 20 seconds to remove the organic solvent in the adhesive composition to form an adhesive layer having a thickness of 4 μm. An unstretched polypropylene film (hereinafter abbreviated as "CPP") having a thickness of 80 μm was used as the thermally adhesive resin film, and attached to the surface in the adhesive layer. Next, a heat seal tester was used and compression-bonding was conducted while applying pressure to the aluminum foil. The bonding temperature was set to 180° C., the pressure was set to 0.3 MPa, and the bonding time was set to 2 seconds. The resulting composite was stored in a hot blast circulation oven (40° C.) for 3 days to obtain a specimen.

(2) Measurement of T-Peel Strength

The specimen was cut to have a width of 15 mm. T-peel strength (N/15 mm) between the aluminum foil and the CPP was measured under conditions of temperature of 25° C. or 80° C., and tensile speed of 100 mm/min.

2. Production of Polyolefin Resin (A) and Solution of Polyolefin Resin (A)

Synthesis Example 1-1

100 parts by mass of a propylene-ethylene random copolymer (MFR: 10 g/10 min, melting point: 85° C., propylene unit content: 97 mol %, ethylene unit content: 3 mol %, hereinafter referred to as "propylene-based random copolymer") that was produced using a metallocene catalyst as a polymerization catalyst, 2 parts by mass of maleic anhydride, 1 part by mass of lauryl methacrylate, and 1.5 part by mass of di-tert-butyl peroxide were kneaded using a twin-screw extruder (maximum temperature of cylinder: 170° C.) to react. The mixture was degassed in the extruder under reduced pressure, and unreacted material was removed to synthesize a polyolefin resin (a1). The polyolefin resin (a1) had an MFR of 12 g/10 min, a melting point of 85° C., an acid value of 20 mg KOH/g, and a carboxyl group content of 0.4 mmol per 1 g of the resin.

Subsequently, 680 g of toluene and 170 g of methyl ethyl ketone (hereinafter referred to as "MEK") are charged to a three-necked flask (internal volume: 1 L) equipped with a stirrer, a thermometer, and a condenser, and the mixture was heated to a temperature of 60° C. while stirring. 150 g of the polyolefin resin (a1) was supplied to the mixture and stirring was conducted for about 1 hour. The resin was dissolved and the mixture was cooled down to room temperature to obtain a solution having a solid content of 15%. The solution is referred to as "PP solution a1".

Synthesis Example 1-2

A polyolefin resin (a2) was synthesized in the same manner as those in Synthesis Example 1-1, except that a propylene-based random copolymer having an MFR of 20 g/10 min was used. The polyolefin resin (a2) had an MFR of 23 g/10 min, a melting point of 85° C., an acid value of 20 mg KOH/g, and a carboxyl group content of 0.4 mmol per 1 g of the resin. The polyolefin resin (a2) was dissolved in the same manner as in Synthesis Example 1-1 to obtain a "PP solution a2".

Synthesis Example 1-3

A polyolefin resin (a3) was synthesized in the same manner as those in Synthesis Example 1-1, except that a propylene-based random copolymer having an MFR of 25 g/10 min was used. The polyolefin resin (a3) had an MFR of 28 g/10 min, a melting point of 84° C., an acid value of 20 mg KOH/g, and a carboxyl group content of 0.4 mmol per 1 g of the resin. The polyolefin resin (a3) was dissolved in the same manner as in Synthesis Example 1-1 to obtain a "PP solution a3".

Synthesis Example 1-4

A polyolefin resin (x1) was synthesized in the same manner as those in Synthesis Example 1-1, except that a propylene-based random copolymer having an MFR of 44 g/10 min was used. The polyolefin resin (x1) had an MFR of 47 g/10 min, a melting point of 84° C., an acid value of 20 mg KOH/g, and a carboxyl group content of 0.4 mmol per 1 g of the resin. The polyolefin resin (x1) was dissolved in the same manner as in Synthesis Example 1-1 to obtain a "PP solution x1".

Synthesis Example 1-5

A polyolefin resin (x2) was synthesized in the same manner as those in Synthesis Example 1-1, except that a propylene-based random copolymer having an MFR of 90 g/10 min was used. The polyolefin resin (x2) had an MFR of 94 g/10 min, a melting point of 83° C., an acid value of 20 mg KOH/g, and a carboxyl group content of 0.4 mmol per 1 g of the resin. The polyolefin resin (x2) was dissolved in the same manner as in Synthesis Example 1-1 to obtain a "PP solution x2".

3. Production of Polyolefin Resin (B) and Dispersion of Polyolefin Resin (B)

Synthesis Example 2-1

100 parts by mass of a propylene polymer having a melting point of 163° C. and 435 parts by mass of toluene were charged to an autoclave (internal volume: 1.5 L) equipped with a stirrer, and the mixture was heated to a temperature of 140° C. while stirring to completely dissolve the polymer. 16 parts by mass of maleic anhydride and 1.5 part by mass of dicumyl peroxide were respectively added dropwise to the solution maintained at 140° C. over 4 hours while stirring. When the addition was finished, the mixture was further stirred at 140° C. for 1 hour to effect a post-reaction to obtain a modified polymer. After completion of the reaction, the solution was cooled down to room temperature, and then acetone was added to the solution to precipitate the modified polymer. The modified polymer was repeatedly washed with acetone, dried, and collected. The modified polymer had a grafted maleic anhydride content of 2.8% by mass, a melting point of 156° C., an acid value of 32 mg KOH/g, and a carboxyl group content of 0.6 mmol per 1 g of the resin.

Subsequently, 15 parts by mass of the modified polymer and 85 parts by mass of toluene were charged to an autoclave equipped with a stirrer. The mixture was heated to a temperature of 130° C. while stirring to completely dissolve the resin. The mixture was cooled down to 90° C. while stirring at a cooling rate of 25° C./hour, cooled to 60° C. at a cooling rate of 5° C./hour, and then cooled to 30° C. at a cooling rate of 20° C./hour to obtain a homogenous milky white dispersion having a solid content of 15%. The average particle size (D50) of the dispersed resin particles was measured, and found to be 11.0 μm. The dispersion is referred to as "PP dispersion b1".

Synthesis Example 2-2

100 parts by mass of a propylene-ethylene copolymer (melting point: 140° C., propylene unit content: 95.7 mol %, ethylene unit content: 4.3 mol %) and 435 parts by mass of toluene were charged to an autoclave (internal volume: 1.5 L) equipped with a stirrer. The mixture was heated to a temperature of 140° C. while stirring to completely dissolve the copolymer. 16 parts by mass of maleic anhydride and 1.5 part by mass of dicumyl peroxide were respectively added dropwise to the solution maintained at 140° C. over 4 hours while stirring. When the addition was finished, the mixture was further stirred at 140° C. for 1 hour to effect a post-reaction to obtain a modified polymer. After completion of the reaction, the solution was cooled down to room temperature, and then acetone was added to the solution to precipitate the modified polymer. The modified polymer was repeatedly washed with acetone, dried, and collected. The modified polymer had a grafted maleic anhydride content of 2.6% by mass, a melting point of 136° C., an acid value of 30 mg KOH/g, and a carboxyl group content of 0.5 mmol per 1 g of the resin.

Subsequently, 15 parts by mass of the modified polymer, 70 parts by mass of toluene, and 15 parts by mass of MEK were charged to an autoclave equipped with a stirrer. The mixture was heated to a temperature of 130° C. while stirring to completely dissolve the resin. The mixture was cooled down to 90° C. while stirring at a cooling rate of 25° C./hour, cooled to 60° C. at a cooling rate of 5° C./hour, and then cooled to 30° C. at a cooling rate of 20° C./hour to obtain a homogenous milky white dispersion having a solid content of 15%. The average particle size (D50) of the dispersed resin particles was measured, and found to be 10.3 μm. The dispersion is referred to as "PP dispersion b2".

Synthesis Example 2-3

100 parts by mass of a propylene-butene copolymer (melting point: 117° C., propylene unit content: 82 mol %, butene unit content: 18 mol %) and 435 parts by mass of toluene were charged to an autoclave (internal volume: 1.5 L) equipped with a stirrer. The mixture was heated to a temperature of 140° C. while stirring to completely dissolve the copolymer. 16 parts by mass of maleic anhydride and 1.5 part by mass of dicumyl peroxide were respectively added dropwise to the solution maintained at 140° C. over 4 hours while stirring. When the addition was finished, the mixture was further stirred at 140° C. for 1 hour to effect a post-reaction to obtain a modified polymer. After completion of the reaction, the solution was cooled down to room temperature, and then acetone was added to the solution to precipitate the modified polymer. The modified polymer was repeatedly washed with acetone, dried, and collected. The modified polymer had a grafted maleic anhydride content of 2.4% by mass, a melting point of 113° C., an acid value of 27 mg KOH/g, and a carboxyl group content of 0.5 mmol per 1 g of the resin.

Subsequently, 15 parts by mass of the modified polymer, 17 parts by mass of toluene, and 68 parts by mass of MEK were charged to an autoclave equipped with a stirrer. The mixture was heated to a temperature of 130° C. while stirring to completely dissolve the resin. The mixture was cooled down to 90° C. while stirring at a cooling rate of 25° C./hour, cooled to 60° C. at a cooling rate of 5° C./hour, and then cooled to 30° C. at a cooling rate of 20° C./hour to obtain a homogenous milky white dispersion having a solid content of 15%. The average particle size (D50) of the dispersed resin particles was measured, and found to be 11.2 μm. The dispersion is referred to as "PP dispersion y1".

Synthesis Example 2-4

100 parts by mass of a propylene-butene copolymer (melting point: 110° C., propylene unit content: 74 mol %, butene unit content: 26 mol %) and 435 parts by mass of toluene were charged to an autoclave (internal volume: 1.5 L) equipped with a stirrer. The mixture was heated to a temperature of 140° C. while stirring to completely dissolve the copolymer. 16 parts by mass of maleic anhydride and 1.5 part by mass of dicumyl peroxide were respectively added dropwise to the solution maintained at 140° C. over 4 hours while stirring. When the addition was finished, the mixture was further stirred at 140° C. for 1 hour to effect a post-reaction to obtain a modified polymer. After completion of the reaction, the solution was cooled down to room temperature, and then acetone was added to the solution to precipitate the modified polymer. The modified polymer was repeatedly washed with acetone, dried, and collected. The modified polymer had a grafted maleic anhydride content of 2.6% by mass, a melting point of 107° C., an acid value of 30 mg KOH/g, and a carboxyl group content of 0.5 mmol per 1 g of the resin.

Subsequently, 15 parts by mass of the modified polymer, 17 parts by mass of toluene, and 68 parts by mass of MEK were charged to an autoclave equipped with a stirrer. The mixture was heated to a temperature of 130° C. while stirring to completely dissolve the resin. The mixture was cooled down to 90° C. while stirring at a cooling rate of 25° C./hour, cooled to 60° C. at a cooling rate of 5° C./hour, and then cooled to 30° C. at a cooling rate of 20° C./hour to obtain a homogenous milky white dispersion having a solid content of 15%. The average particle size (D50) of the dispersed resin particles was measured, and found to be 10.0 μm. The dispersion is referred to as "PP dispersion y2".

4. Preparation and Evaluation of Adhesive Composition

Example 1

10 g of the PP solution a1 and 190 g of the PP dispersion b1 were charged to a flask (internal volume: 300 ml) equipped with a condenser and a stirrer, and the mixture was stirred at room temperature for 10 minutes to obtain a liquid mixture. 0.15 mg of dibutyltin dilaurate (DBTL) as a reaction accelerator was then added to the liquid mixture and the components were further mixed to obtain a cloudy liquid resin composition having a viscosity at 25° C. of 43 mPa·s and a resin concentration of 15% by mass.

Subsequently, a polyfunctional isocyanate compound ("Duranate TPA-100" manufactured by Asahi Kasei Chemicals Corporation) was formulated to the resin composition as a base resin so that the equivalent ratio "NCO/OH" was 1.5 to obtain an adhesive composition. The adhesion test was performed using the adhesive composition. The specimen was prepared using the adhesive composition within 1 hour after the addition of the polyfunctional isocyanate compound. The composition and the evaluation results are shown in Table 1.

Examples 2 to 9

Adhesive compositions were prepared in the same manner as those in Example 1, except that the amounts and types of the PP solution, the PP dispersion, the reaction accelerator, and the polyfunctional isocyanate compound were changed as shown in Table 1. The adhesion test was performed in the same manner as described above. The compositions and the evaluation results are shown in Table 1.

In Example 8, the viscosity (25° C.) of the resin composition before adding the polyfunctional isocyanate compound was 68 mPa·s.

Comparative Example 1

The PP dispersion b1 was used as the adhesive composition, and subjected to the adhesion test. The composition and the evaluation results are shown in Table 1.

The viscosity (25° C.) of the resin composition before adding the polyfunctional isocyanate compound was 40 mPa·s.

Comparative Examples 2 and 3

Adhesive compositions were prepared in the same manner as those in Example 1, except that the amounts and types of the PP solution, the PP dispersion, the reaction accelerator, and the polyfunctional isocyanate compound were changed as shown in Table 1. The adhesion test was performed in the same manner as described above. The compositions and the evaluation results are shown in Table 1.

since Comparative Example 1 is an example of an adhesive composition consisting of the PP dispersion b1, the bond strength at 25° C. was low. The adhesive compositions of Comparative Examples 2 and 3 exhibited insufficient bond strength at 25° C. and 80° C. since the adhesive composition was prepared using the PP solution that falls outside the scope of the invention and the PP dispersion b1.

INDUSTRIAL APPLICABILITY

The adhesive composition of the present invention is suitably used to bond a polyolefin resin-formed body and other member such as a metal member and resin member, and can be used to bond polyolefin resin-formed bodies such as polyolefin resin films, or bond a polyolefin resin film and a metal layer of a composite film having a resin layer and a metal layer. The thermally adhesive member obtained using the adhesive composition of the present invention containing the polyolefin resin (A) and polyolefin resin (B) exhibits excellent heat resistance (heat resistant adhesion), and can be used to form a food packaging material, a chemical packaging material, and the like.

What is claimed is:

1. An adhesive composition, comprising:
an organic solvent,
a polyolefin resin A that is dissolved in the organic solvent, and
a polyfunctional isocyanate compound,
wherein the polyolefin resin A has a melt flow rate measured at 130° C. of 5 to 40 g/10 min, and comprises a carboxyl group, and
wherein the polyolefin resin A has a melting point of 84° C. to 90° C.

2. The adhesive composition according to claim 1, wherein a content of the carboxyl group in the polyolefin resin A is in a range of from 0.01 to 2.0 mmol based on 1 g of the polyolefin resin A.

3. The adhesive composition according to claim 2, further comprising a polyolefin resin B that has a melting point of from 120° C. to 170° C., and comprises a carboxyl group.

TABLE 1

|  |  |  | Example |  |  |  |  |  |  |  |  | Comparative Example |  |  |
|---|---|---|---|---|---|---|---|---|---|---|---|---|---|---|
|  |  |  | 1 | 2 | 3 | 4 | 5 | 6 | 7 | 8 | 9 | 1 | 2 | 3 |
| Component | PP solution a1 (g) |  | 10 | 60 | 140 | 60 |  |  | 200 | 60 | 60 |  |  |  |
|  | PP solution a2 (g) |  |  |  |  |  | 60 |  |  |  |  |  |  |  |
|  | PP solution a3 (g) |  |  |  |  |  |  | 60 |  |  |  |  |  |  |
|  | PP solution x1 (g) |  |  |  |  |  |  |  |  |  |  |  | 60 |  |
|  | PP solution x2 (g) |  |  |  |  |  |  |  |  |  |  |  |  | 60 |
|  | PP dispersion b1 (g) |  | 190 | 140 | 60 |  | 140 | 140 |  |  |  | 200 | 140 | 140 |
|  | PP dispersion b2 (g) |  |  |  |  | 140 |  |  |  |  |  |  |  |  |
|  | PP dispersion y1 (g) |  |  |  |  |  |  |  |  | 140 |  |  |  |  |
|  | PP dispersion y2 (g) |  |  |  |  |  |  |  |  |  | 140 |  |  |  |
|  | Dibutyltin dilaurate (mg) |  | 0.15 | 0.15 | 0.15 | 0.15 | 0.15 | 0.15 | 0.15 | 0.15 | 0.15 | 0.15 | 0.15 | 0.15 |
|  | Polyfunctional isocyanate compound (g) |  | 4.6 | 4.1 | 3.4 | 3.9 | 4.1 | 4.1 | 2.9 | 3.6 | 3.9 | 4.7 | 4.1 | 4.1 |
|  | Equivalent ratio (NCO/OH) |  | 1.5 | 1.5 | 1.5 | 1.5 | 1.5 | 1.5 | 1.5 | 1.5 | 1.5 | 1.5 | 1.5 | 1.5 |
| Evaluation | T-peel strength (N/15 mm) | 25° C. | 16 | 25 | 23 | 25 | 24 | 24 | 16 | 14 | 13 | 11 | 8 | 8 |
|  |  | 80° C. | 12 | 10 | 9 | 10 | 10 | 10 | 9 | 6 | 5 | 7 | 7 | 7 |

Results shown in Table 1 indicates that adhesive compositions of Examples 1 to 9 led to bond strengths at 25° C. of 13 N or higher, and the bond strength of the adhesive compositions of Examples 1 to 7 at 80° C. were as high as 9 N or higher, being excellent in heat resistance. On the other hand, 4. The adhesive composition according to claim 3, wherein a content of the carboxyl group in the polyolefin resin B is in a range of from 0.01 to 2.0 mmol based on 1 g of the polyolefin resin B.

5. The adhesive composition according to claim 3, wherein the polyolefin resin B is insoluble in the organic solvent, and an average particle size of the polyolefin resin B is of from 1 to 50 µm.

6. The adhesive composition according to claim 3, wherein a content of the polyolefin resin A and a content of the polyolefin resin B are respectively 1% to 70% by mass and 30% to 99% by mass based on 100% by mass of a total amount of the polyolefin resin A and the polyolefin resin B.

7. The adhesive composition according to claim 1, further comprising a polyolefin resin B that has a melting point of from 120° C. to 170° C., and comprises a carboxyl group.

8. The adhesive composition according to claim 7, wherein a content of the carboxyl group in the polyolefin resin B is from 0.01 to 2.0 mmol based on 1 g of the polyolefin resin B.

9. The adhesive composition according claim 7, wherein the polyolefin resin B is insoluble in the organic solvent and has an average particle size of from 1 to 50 µm.

10. The adhesive composition according to claim 7, wherein a content of the polyolefin resin A and a content of the polyolefin resin B are respectively 1% to 70% by mass and 30% to 99% by mass based on 100% by mass of a total amount of the polyolefin resin A and the polyolefin resin B.

11. A thermally adhesive member comprising an adhesive layer obtained by a process comprising curing the adhesive composition according to claim 1, wherein a metal layer is bonded to one side of the adhesive layer, and a thermally adhesive resin layer is bonded to the other side of the adhesive layer.

* * * * *